Dec. 8, 1970 A. BRIL ET AL 3,546,515

PHOTOCATHODE CONTROL OF ELECTRON FLOW THROUGH LEAD MONOXIDE, BOMBARDMENT-INDUCED CONDUCTIVITY LAYER

Original Filed July 8, 1966

INVENTORS
ALFRED BRIL
EDWARD F. DE HAAN
BY
Frank R. Trifari
AGENT

United States Patent Office 3,546,515

Patented Dec. 8, 1970

3,546,515

PHOTOCATHODE CONTROL OF ELECTRON FLOW THROUGH LEAD MONOXIDE, BOMBARDMENT-INDUCED CONDUCTIVITY LAYER

Alfred Bril and Edward Fokko de Haan, Emmasingel, Eindhoven, Netherlands, assignors, by mesne assignments, to U.S. Philips Corporation, New York, N.Y., a corporation of Delaware

Continuation of application Ser. No. 563,918, July 8, 1966. This application Jan. 10, 1969, Ser. No. 792,206
Claims priority, application Netherlands, July 15, 1965, 6509140
Int. Cl. H01j *31/26, 31/38*
U.S. Cl. 313—65 1 Claim

ABSTRACT OF THE DISCLOSURE

A device for detecting "fast" charge carrying particles, i.e. electrons, protons and α-particles is disclosed which employs a target consisting of a "bombardment induced conductive material," i.e. a material whose electrical conductivity varies in accordance with the intensity of the bombardment and energy of the particles. A material suitable for this purpose is lead monoxide having a zone of intrinsic conductivity between a zone of p-type conductivity adjacent a negative terminal and a zone of n-type conductivity adjacent a positive terminal. The target may be connected to a suitable measuring circuit, or may be incorporated in a cathode-ray tube where it may be scanned by a beam of slow velocity electrons.

Figure 1:
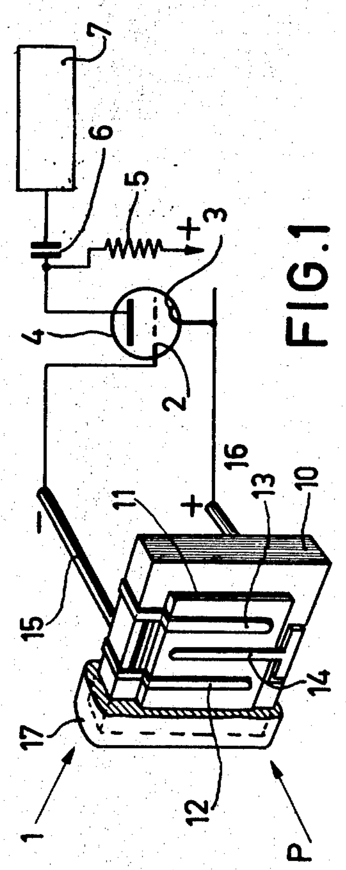

This application is a continuation of application Ser. No. 563,918 filed July 8, 1966.

The invention relates to a device for detecting fast, charge-carrying particles. More particularly the invention relates to a device provided with a body of bombardment induced conductive material which is to be incorporated in an electric circuit, this body exhibiting a variation of the electric conductivity when exposed to such fast particles.

"Bombardment induced conductive material" is to be understood to mean herein a material whose electric conductivity varies under the bombardment with fast charge carrying particles, for example, electrons, protons and α-particles, in agreement with the intensity of the bombardment and the energy of said particles.

A number of materials are known, some insulating and also a few photoconductive materials, which exhibit bombardment induced conductivity. This property may be used inter alia for counting fast particles, for switching under the influence of a controlled electron beam and for obtaining television signals corresponding to an electron image. Among such materials showing bombardment induced conductivity are: diamond, zinc sulphide, silicon, germanium, selenium, magnesium oxide, cadmium selenide and cadmium sulphide.

Since a space charge is created in insulating bombardment induced conductive material when a direct voltage is applied across it and space charge prevents further passage of electric current, it is preferable to use a photoconductive semi-conductor material instead of an insulating material. Another drawback of the former material is that, as a rule, the specific resistivity of said material in the non-exposed condition, that is to say in the dark and without bombardment with fast particles, is comparatively low which causes a noticeable quiescent current.

We have found that the materials showing bombardment induced conductivity include lead monoxide. The invention is based on the discovery that this material is very suitable for use in a device in which the aforesaid property is used, provided that measures are taken which are known in photo-electrically conductive devices employing this material for obtaining a low dark current and a favorable photo-sensitivity. For that reason also lead monoxide is favorable because the current amplification factor, that is to say the ratio of the variation in current of the material to the electric current corresponding to the charge per unit time, which is supplied to the lead monoxide during its bombardment by the fast particles, may be more than $10^3$.

According to the invention, a device for detecting fast, charge-carrying particles employs a bombardment-induced conductive body substantially consisting of lead monoxide (PbO), a major portion which acts as if it were intrinsically conductive in that upon application of an electric voltage to said body the voltage gradient in this major portion is substantially constant. The lead monoxide at the area of the negative current supply or terminal has a p-type conductivity and at the area of the positive current supply or terminal has n-type conductivity. An advantage of the use of lead monoxide as a bombardment-induced conductive material is that this material can show both electron and hole conductivity. The depth of penetration of the fast particles generally is only very low. For example, for electrons having an energy of approximately 20 kv., this depth is approximately 1 micron. Because lead monoxide has both hole and electron conductivity it is of little significance whether the bombardment takes place at the region of the positive, or that of the negative current supply to the lead monoxide. This is in contrast with various other bombardment-induced conductive materials which exhibit substantially either only hole or electron conductivity. For example, with selenium and cadmium selenide respectively, in which, in order to obtain a current as a result of the bombardment-induced conductivity, the bombardment must be effected in the immediate proximity of the positive and negative electrodes, respectively.

In a copending patent application, Ser. No. 350,713 a process is described for obtaining lead monoxide, a major part of which exhibits substantially intrinsic conductivity type by vapor-depositing lead monoxide, or by treatment of the vapor-deposited lead monoxide in a water-vapor-containing oxygen atmosphere. For example, vapor-deposition may be carried out in an atmosphere of a total pressure between $1000\times10^{-5}$ and $2200\times10^{-5}$ mm. Hg, the partial pressure of the water vapor being 30 to 20% of said total pressure, preferably proportionally lower according as the total pressure is higher.

In addition, lead monoxide having p-type conductivity at the area of the negative current supply may be obtained by doping, the lead monoxide at that area, with thallium or silver. However, it is preferable to bombard the lead monoxide at that area with oxygen by means of a gas discharge. N-type conductive lead monoxide at the area of the positive electrode may be obtained by providing an n-forming element at the area, for example, by a small excess of lead, or by suitable choice of the electrode in contact with the lead monoxide, for example, an electrode of conductive tin oxide or aluminum.

In one embodiment of the invention the target plate of a cathode-ray tube scanned by an electron beam to obtain electrical signals corresponding to a charge image on the target plate, consists of a layer of micro-crystalline lead monoxide, approximately 1 to 50 microns thick. The part of the layer which is in contact with a conductive electrode consists of n-type conductive lead monoxide, while the lead monoxide on the free surface of the layer remote from the said electrode has p-type conductivity. The tube also includes opposite the free surface of the lead monoxide layer an electron gun for producing an electron beam which scans the layer with slow electrons.

Further means are provided to bombard the target plate with fast-charge-carrying particles to obtain, at a potential which is positive with respect to the cathode of the electron gun via the electrical conductivity of the target plate—which varies locally as a result—a charge image of said target plate to be scanned by the electron beam, which corresponds to the information contained in the distribution of the fast particles on the target plate. The stream of fast particles directed on the target plate may originate from a photo-cathode. This stream may also be formed by an electron beam carrying the image information in an electron microscope, or an electron diffraction apparatus. Alternatively, said stream may consist of an electron beam, adapted to scan the target, and which is intensity-modulated by electrical signals to be stored temporarily so that the device functions as a memory tube.

Figures 2, 3:
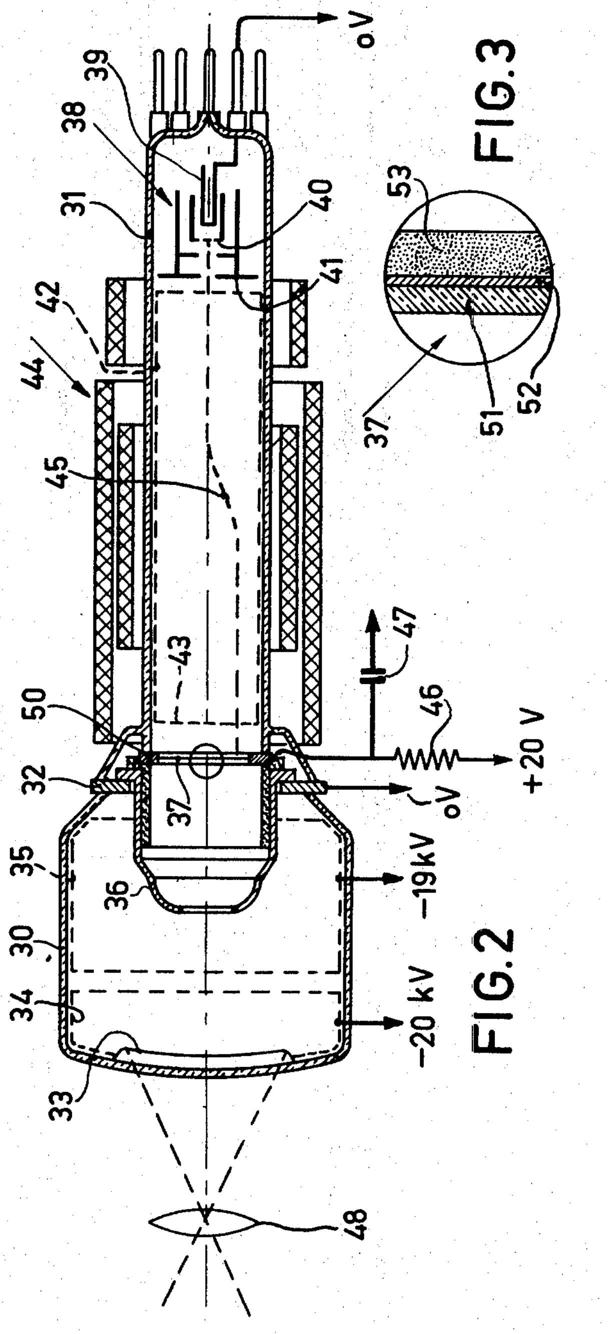

The invention will be described with reference to the accompanying drawing, in which FIG. 1 diagrammatically shows a particle counter, while, FIG. 2 is a longitudinal section of a television camera tube of which, FIG. 3 shows a section of the target plate on an enlarged scale.

The particle counter shown in FIG. 1 comprises a pick-up element 1 which is connected between the grid 2 and the cathode 3 of a vacuum triode, or a multi-grid tube 4. The anode of tube 4, which is supplied through a resistor 5 with a positive voltage with respect to the cathode 3, is connected through a capacitor 6 to a pulse recording device 7 not further described.

The pick-up element 1 comprises an insulating plate 10, for example, of glass or ceramic material. On one side of this plate, there is a layer of vapor-deposited lead monoxide 11 the thickness of which is at least 1 micron, but may be considerably more, for example 100 microns. On the outside layer 11 are three interlaced linear vapor-deposited electrodes 12, 13 and 14 which continue onto the plate 10. On plate 10 electrodes 12 and 13 are electrically interconnected and provided there with a connection member 15 projecting to the rear side. On plate 10 the central electrode 14 is also provided with a similar connection member 16. The electrodes 12 and 13 consist of vapor-deposited silver having a width of approximately 0.5 mm. The intermediate electrode 14 which has the same width consists of vapor-deposited aluminum. The interspace between the electrodes is approximately 1 mm. The pick-up element 1 is surrounded by a thin, but opaque and insulating lacquer layer 17, which is shown broken away for the greater part in FIG. 1.

The layer 11 of lead monoxide was vapor deposited in an oxygen atmosphere comprising water-vapor, the plate 10 being kept at a temperature of approximately 100 to 120° C. As a result of this the layer 11 consists of lead monoxide which for the major part acts as if it were of substantially intrinsic conductivity, i.e., upon application of an electric voltage to the electrodes there exists in the major part of the lead monoxide between the electrodes a more or less constant voltage gradient. After vapor-deposition of the electrodes 12 to 14, the lead monoxide immediately adjoining the electrodes 12 and 13, was converted to p-type conductivity. This was done, for instance, by an additional thermal treatment (for example, at a temperature of approximately 150° C.), in an atmosphere containing an inert gas, such as argon and oxygen, having a partial pressure of less than $2000\times10^{-5}$ mm. Hg, and furthermore water-vapor having a partial pressure of about 500 to $600\times10^{-5}$ mm. Hg. The lead monoxide in immediate contact with the electrode 14 is somewhat n-type conductive. During operatiton of the pick-up element the electrode 14 should constitute a positive current supply and the electrodes 12 and 13 should constitute a negative current supply for the lead monoxide. In the counting device shown in FIG. 1, the current through the pick-up element 1 is constituted by the grid current of the tube 4. The electrodes 12 and 13 accordingly are connected to the grid 2 and the cathode 3 of tube 4 respectively.

The pick-up element 1 is suitable for picking up fast particles (beam P in FIG. 1) for example, α-particles emitted by radio-active preparations provided for medical examination in certain organs of a patient. The patient can be scanned with element 1 for establishing local concentrations of the radio-active preparation. The particle picked up by the element 1 causes the lead monoxide layer 11 to become electrically conductive which manifests itself as positive pulses on the grid 2 of the tube 4, these pulses being recorded by the counting device 7.

The cathode-ray tube shown in FIGS. 2 and 3 comprises a glass envelope consisting of two parts 30 and 31 which are sealed with their open ends to a fernico-ring 32. The part 30 surrounds an electron-optical section of the tube which has a photo-cathode 33 on the left-hand side. The photo-electrons emitted by it are found by means of an electric field produced by suitable voltages at a first wall lining 34 consisting of a transparent aluminum layer which extends to just below the photo-cathode 33, a second similar wall lining 35 further to the right in the figure in the part 30 and a nozzle-like anode 36 which is secured to the ring 32 on a target plate 37 arranged approximately in the transition of the two parts 30 and 31. The part 31 which substantially constitutes a vidicon section, surrounds with its closed end an electron gun 38 comprising a cathode 39, a control grid 40 and a perforated anode 41, which is electrically connected to a wall electrode 42. In the proximity of the target plate 36 wall electrode 42 is terminated by a grid 43. By means of the deflection and focussing coils around part 31, commonly used in tubes of the vidicon type, which coils are collectively denoted by 44 in FIG. 2, an electron beam 45 emitted by the gun 38 and directed to the right-hand side of the target plate 37, is given a scanning movement.

The target plate 37 consists of a membrane 51 of aluminum oxide, of approximately 0.1 micron thickness, stretched on a metal ring 50. On the side of the electron gun 38, a thin layer 52 of aluminum, approximately 0.05 micron thick, is vapor-deposited on this membrane and is in electric contact with the ring 50. On this aluminum layer 52, which constitutes a signal electrode a layer 53 of lead monoxide, PbO is vapor-deposited having a thickness of approximately 5 microns.

FIG. 3 shows a cross-section of the various layers of the target plate, in which, however, the mutual thickness ratios are now shown in proper scale. On the side of the electrode 52, a very small portion of the thickness of the layer 53 consists of lead monoxide which is somewhat n-type conductive, while the lead monoxide on the free-surface of the layer 53 facing the electron gun 38 consists of lead monoxide which has p-type conductivity; for the remainder the layer 53 consists of lead monoxide acting as if it were intrinsic lead monoxide, that is to say lead monoxide, the Fermi level of which lies substantially centrally between the conduction band and the valence band. This layer 53 can be obtained, for example by vapor-depositing lead monoxide in a water-vapor containing oxygen atmosphere having a partial water-vapor pressure decreasing during vapor-deposition as described in copending application Ser. No. 350,713. The lead monoxide having p-type conductivity on the surface facing the electron gun 38 of the layer 53 is obtained by exposing the vapor-deposited layer to an oxygen bombardment by means of a gas discharge. For that purpose a gas discharge may be effected in an oxygen atmosphere having a pressure of approximately $5000\times10^{-5}$ mm. Hg for a period between 10 and 60 seconds, this discharge occurring between the lead monoxide layer and an electrode arranged opposite to it at some distance, such that the current density in the vapor-deposited lead monoxide layer is approximately 8 milliamperes per sq. cm.

The operation of the tube described is as follows: For operation of the tube various parts of the tubes are supplied with different voltages, namely, in such manner that the wall lining 34, and consequently the photo-cathode 33, obtain a potential which is approximately 20 kv. lower than that of the anode 36. The potential of the target plate ring 50 should differ only comparatively slightly from the potential of the anode in a positive or a negative sense, while the cathode 39 of the gun 38 is given a potential which is lower by a few tenths of a volt than that of the rings 50. In the supply conductor to the ring 50 a signal resistor 46 is included; the electric signals occurring across it as a result of scanning the target plate 37 by the electron beam 45 are derived through a capacitor 47.

During the scanning of the free-surface of the layer 53 with the electron beam 45, the potential of this surface is stabilized at the potential of the cathode 39. If an optical image is projected on the photo-cathode 33, for example, by means of a diagrammatically shown optical system 48, the photo-cathode emits a stream of photo-electrons, the local intensity of which is a measure of the local illumination intensity of the optical image on photo-cathode 33. The photo-electrons are focussed on the target plate 37 by the electric field between the cathode and the wall lining 35 and the anode 36, the electrons of the stream passing through the membrane 51 and the signal electrode 52 without significant loss of energy and causing bombardment-induced conductivity in the part of the lead monoxide layer 53 adjoining said electrode. The holes released in the material are displaced to the free surface of the layer 53 producing there a positive charge image corresponding to the optical image on the photo-cathode 33.

On further scanning of the free surface of the layer 53, with the electron beam 45, the charge image is converted in known manner into electrical image signals across the resistor 46. As a result of the large current amplification in the lead monoxide, due to the bombardment induced conductivity produced in the layer by the photo-electrons, clear electrical signals can be obtained on the photo-cathode 33 even with a weak optical image. The tube described consequently is suitable for use at low illumination intensities, for example, in space research and in astronomy. Since, in addition, the quiescent current herein is low as a result of the constitution of the layer 53 of lead monoxide, local variations in the quiescent current have substantially no effect so that also comparatively small contrasts in the image produce significantly different signals. To prevent increase of the quiescent current in the layer 53 as a result of photo-conductivity, it should be ensured that no light impinges on the layer. The membrane 51 and the signal electrode 52 ensure a satisfactory optical screening on the side of the photo-cathode 33.

What is claimed is:

1. A cathode ray tube responsive to low level illumination comprising a photocathode, means for accelerating photo-emitted electrons from said photocathode by potentials in the kilovolt range, a bombardment-induced conductivity target, means focusing said electrons on said target, said target comprising an aluminum oxide membrane facing said photocathode, an aluminum signal layer transmissive to said photo-emitted electrons on said membrane, and an approximately 1 to 50 microns thick layer of lead monoxide on said signal electrode, the surface of said layer in contact with said electrode having n-type conductivity and the other surface having p-type conductivity, the major portion of said layer intermediate said surfaces being substantially intrinsically conductive, whereby conductivity induced by said photo-emitted electrons forms a charge image in said layer, an electron gun in said cathode ray tube, the potential difference between the cathode of said gun and said signal electrode being on the order of one volt or less, and means for scanning said bombardment-induced conductivity layer with slow-moving electrons from said cathode, whereby said charge image controls electron flow to said signal plate during scanning.

References Cited

UNITED STATES PATENTS

| | | | |
|---|---|---|---|
| 2,886,726 | 5/1959 | Berger et al. | 313—65A |
| 2,890,359 | 6/1959 | Heijne et al. | 313—65A |
| 3,289,024 | 11/1966 | De Haan et al. | 313—65A |
| 3,002,124 | 9/1961 | Schneeberger | 313—BIC dig. |
| 3,123,737 | 3/1964 | Schneeberger | 313—BIC dig. |
| 2,776,387 | 1/1957 | Pensak. | |
| 2,890,359 | 6/1959 | Heijne et al. | |
| 3,345,514 | 10/1967 | Komoda. | |

OTHER REFERENCES

Weimer: "Television Pickup Tube Target," RCA Technical Notes; RCA TN No.: 238; received January 1959 (2 sheets).

ROBERT SEGAL, Primary Examiner

U.S. Cl. X.R.

313—95